April 20, 1965   R. B. INGRAHAM   3,179,646
POLYMERIZATION TO PRODUCE FRIABLE AGGREGATES
OF INDIVIDUAL SPHERES OF POLYVINYL CHLORIDE
Filed Sept. 28, 1959

10 Microns

1 Micron

1 Inch

50 Microns

1 Inch

10 Microns

INVENTOR.
Robert B. Ingraham
BY

AGENT 3,179,646
POLYMERIZATION TO PRODUCE FRIABLE AGGREGATES OF INDIVIDUAL SPHERES OF POLYVINYL CHLORIDE
Robert B. Ingraham, Midland, Mich., assignor to The Dow Chemical Company, Midland, Mich., a corporation of Delaware
Filed Sept. 28, 1959, Ser. No. 842,628
5 Claims. (Cl. 260—92.8)

This invention relates to new and improved forms of polymers from which polymer particles of a size and shape suitable for use in plastisols, organosols and hydrosols may be easily isolated. More particularly it relates to friable aggregates of individual spheres of polyvinyl chloride.

This application is a continuation-in-part of copending U.S. application Serial No. 563,041, filed February 2, 1956, and now abandoned.

Plastisols are well known in the art as fluid or pasty dispersions of particles of a thermoplastic resin in a plasticizer which is a poor solvent for the resin at ordinary temperatures, but which readily dissolves the resin particles at elevated temperatures. Plastisols form a rigid gel structure when cooled after being heated to dissolve the polymer particles. It is exteremely important that the polymer used in making the plastisol be as free as possible of contaminants. Contaminants cause variations in the properties, such as viscosity, of the plastisol from batch to batch and affect the properties, such as the electrical properties, of articles prepared from such plastisols.

Plastisols are very desirable means from which to fabricate certain thermoplastic polymers into useful forms. Various coating, casting, and low pressure molding operations are easily accomplished using plastisols.

The particles to be used in a plastisol should preferably be spherically shaped to present as small a particle surface as possible for minimum solvation. Also, a dispersion of spheres provides the lowest flow viscosity for charging molds, for cloth coating, and like operations. Cubes and irregularly shaped fragments of spherical particles are not desirable for use in plastisols. Such particles solvate too readily or pack too tightly giving a plastisol with a viscosity that is too high for easy workability.

The spheres of thermoplastic polymer to be utilizable in this invention may have a wide range of individual diameters, e.g. from 0.05 micron to 5.0 microns as measured from an electron micrograph. It is preferred to use polymers with an average particle diameter of from 0.3 micron to 2.0 microns and with a minimum of particles outside of this range. Polymeric spheres with an average diameter significantly smaller than 0.3 micron will solvate too rapidly, causing premature gelation, and thus shortening the possible storage time of the plastisol before use. Particles larger than 5 microns tend to settle out of suspension and the number of particles with diameters over 2 microns should be held to a minimum. The requirements for the size and shape of the polymer particles are generally the same for organosols and hydrosols as described for plastisols.

It has been the practice to make plastisols from polymers prepared in aqueous emulsion. The latex, or polymer emulsion, has been spray dried and the resulting aggregates of polymer particles have been used, with or without grinding, to make the plastisols. The polymer particles produced in emulsion are individually spherical and have diameters ranging from 0.01 micron to 0.3 micron, with the average size usually being between 0.05 and 0.2 micron. When spray dried, such particles form aggregates, and these aggregates necessarily contain the soaps or other emulsifiers and water-soluble agents commonly employed during emulsion polymerization procedures. Normally a latex requires the addition of extra surface active agent to impart sufficient mechanical stability to the latex to be able to withstand the severe stresses which are encountered during spray drying. That added surface active agent is a foreign material which increases the problem of removing all contaminants from the dried polymer. Even traces of the usual anionic emulsifiers may adversely affect plastisol properties. The larger aggregates require grinding before making a plastisol, and the spray dried emulsion polymers, when ground, have given too fine and too irregularly shaped particles for optimum plastisol properties. If latexes or very fine dispersions are attempted to be flocculated the result generally is an unfilterable slime. Additionally the flocculating agents, such as some electrolytes, are contaminants which affect plastisol properties. When it has been attempted to produce larger particles of the polymers for use in plastisols, by non-emulsified polymerization in aqueous suspension (sometimes called "pearl," "granular" or "suspension" polymerization), the particles obtained have generally been much larger than the optimum upper limit of 2 microns diameter. Quite commonly the particles exceed 0.1 inch (over 2,500 microns) in diameter. Such common particles have required crushing and grinding to be reduced to a size capable of being used in plastisols and, because of the varying sizes and irregular shapes of the crushed fragments, the plastisols produced from them have high viscosities relative to their solids content. Also the excessive grinding required develops excessive heat which tends to fuse the polymer.

It is among the objects of the invention to provide polymers in forms from which spherical polymer particles, free from anionic emulsifiers and other troublesome water-soluble contaminants, may be easily isolated consistently with diameters predominantly in the range from 0.3 to 2 microns, suitable for use in making plastisols. A related and principal object is to proivde, as a new and useful article of commerce, a polymeric product, consisting essentially of a friable aggregate of unbroken spherical particles of the polymer with diameters predominantly in the range from 0.3 to 2 microns and free from anionic emulsifiers and other troublesome water-soluble contaminants and ideally suited for use in plastisols. Another object is to provide such a polymeric product in aggregates of the spherical particles which are friable and respond to rubbing or grinding to separate freely into said individual spherical particles with diameters chiefly in the range from 0.3 to 2 microns.

The relative sizes of the aggregates and of the individual particles of the present invention are illustrated in the annexed drawing, wherein FIG. 1 illustrates a conventional aggregate of spray-dried polymer latex particles;

Figure 1:
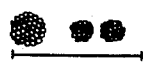
Figure 2:
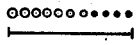
FIG. 2 illustrates the individual latex particles.
Figure 3:
FIG. 3 shows the relative common sizes of polymer particles made by conventional suspension methods.
Figure 4:
FIG. 4 illustrates the broken or crushed particles obtained by grinding large particles prepared by conventional suspension polymerization methods.
Figure 5:
FIG. 5 shows the friable aggregates of the present invention.
Figure 6:
FIG. 6 shows the individual unbroken spherical particles obtained by milling the aggregates of FIG. 5.

The principal objects of this invention are accomplished by polymerizing vinyl chloride with or without minor amounts of comonomers under controlled conditions in non-emulsified aqueous suspension, as will be described, in such a manner that a friable aggregate of discrete spheres of polymer is produced. This aggregate is capable of retaining its identity through the usual conventional polymer handling operations and then of being divided into the discrete spheres. The means of division should not be so severe as to fracture or otherwise distort the spheres of polymer, or to expose the polymer to excessive heat. The spheres so-formed are suitable for use in plastisols without further grinding or shaping.

It should be understood that the invention is not limited to polyvinyl chloride, but that minor amounts of monomers which are polymerizable under the conditions of this invention to produce thermoplastic water-insoluble copolymers similar to polyvinyl chloride may be used. It is preferred, however, to use vinyl chloride or comonomeric mixtures of vinyl chloride with a small amount of another monomer such as vinyl acetate or acrylonitrile.

It is necessary to use water-soluble catalysts in the polymerization procedure of this invention. The usual oil-soluble catalysts, such as benzoyl peroxide and lauroyl peroxide, employed in suspension polymerization techniques do not provide the desired friable aggregates and consequently are not suitable for use in this invention. The amount of catalyst used will vary according to the rate of polymerization desired and other variables but is preferably used at a concentration of 0.1 to 5.0 percent of the weight of monomer. The preferred catalyst is potassium persulfate.

It is preferred to carry out the polymerization in the presence of an inert atmosphere such as nitrogen gas so as to obtain more uniform and faster rates of polymerization. Also, in many cases, a more stable polymer results.

It is mandatory that the polymerizing dispersion be agitated during polymerization to effect and to maintain the dispersion of the monomer phase into droplets and also to attain more efficient and uniform heat transfer throughout the polymerization system. Because the usual granulating or emulsifying agents are not used in the instant process the dispersion must be maintained by mechanical means. Agitation has little or no effect on the final particle size of the polymer and has little effect on the size of the aggregates, except where extremely high rates are employed. With very high rates of agitation, sufficient shearing forces are produced to break up the aggregates prior to isolation of the polymer. When agitation is discontinued after the monomer is dispersed but before polymerization has proceeded past the sticky state, the aggregates are formed, but the spheres of polymer are cemented more rigidly together.

The polymerization is preferably carried to 70 to 90 percent conversion. Above 90 percent conversion the aggregates tend to be more rigidly cemented together. Below 70 percent the process becomes economically less desirable.

It has been found that the temperature of polymerization affects the friability of the aggregates of spheres. With increasing temperatures of polymerization the spheres comprising the aggregates adhere more rigidly requiring more vigorous grinding to separate them into individual spheres. It has been found that if the aggregates are to be readily friable without fracture of the spheres the polymerization must be conducted at a temperature under 45° C.

Certain water-dispersible or water-soluble agents are added to the aqueous phase of the polymerization charge prior to polymerization induction. These agents are necessary to the attainment of the friable aggregates of polymeric spheres. These agents aid in producing the dispersion of relatively large aggregates of the small polymer particles of this invention. The desired aggregates never resulted when the agents were omitted. The useful agents are low molecular weight, non-micelle-forming organic compounds having several water-solubilizing or hydrophilic groups, such as OH or COOH. Suitable agents are such poor emulsifiers or dispersants for the monomer being polymerized that they will neither maintain the monomer in dispersion nor produce a latex-like product requiring coagulation to isolate the polymer. Examples of suitable agents are hexaethylene glycol monolaurate, sugars, water-soluble salts of ethylene diamine tetraacetic acid or of nitrilo triacetic acid, and glycols. Active solvents or softeners for polyvinyl chloride or for the copolymer being produced cannot be employed to obtain the present result. The useful range of concentration of these agents is 0.05 to 15 percent of the weight of the monomer used. Greater amounts may leave residues which will adversely affect the clarity of plastisols produced from the polymer.

The usual granulating agents that are used in conventional suspension polymerizations do not result in the desired aggregates. Thus when starch, cellulose ethers, gelatin, agar agar, and water soluble gums are employed in place of or in conjunction with the above identified agents, the result is recovery of large particles which cannot be reduced to a requisite for plastisols without fracturing the spherical shape. In addition the common emulsifying agent including soaps, synthetic surface active agents and the like do not permit attainment of the stated objectives even when used in such concentration that the individual spheres are of the proper size. No friable aggregates of these particles are produced with such micelle-forming materials.

The aggregates resulting from the process of this invention are generally from 25 microns to 2.0 cms. in diameter preferably from 25 microns to 1.5 cms. and are composed of individual spheres of polymer having diameters of from 0.3 to 2.0 microns. The aggregates represent a distinct improvement over the prior means of preparing polymers for resin dispersions in that the polymers when in the aggregate are in a form that is easily handled during the final stages of polymerization and attendant operations such as filtering, centrifuging, and packaging, and yet may be easily formed into individual spherical polymer particles of a size useful for resin dispersions by simple comminution. When polymers having diameters of less than 25 microns are put through the normal polymer handling operations, they present ventilation problems, they tend to pack when stored, they clog filters and sieves, and they do not feed easily through hoppers and other processing equipment. Polymer aggregates having diameters larger than 2.0 cms. are difficult to wash and to dry and additionally are difficult to feed into any kind of polymer comminuting apparatus.

The individual spherical particles forming each aggregate are held to one another with sufficient tenacity to allow the normal polymer processing operations to be conducted without disintegration of the aggregate. However, the individual spherical particles are easily isolated from the aggregate in unbroken and undistorted form by light grinding or rubbing. It should be understood that the individual particles do not cohere to one another through inter-particulate fusion as might be the case if individual spherical polymer particles were thermally fused together to form a single integral porous polymer particle. The separation of such an integral particle would require the fracture of a weld between the individual particles giving a rough surface at the point of fracture which would seriously affect the properties of a subsequently prepared polymer dispersion.

The aggregates are likewise not glued or held together with a foreign adhesive. The separation of such aggregates could be easily accomplished but the foreign adhesives would either have to be left on the particles or removed by a troublesome separate washing and drying operation.

The aggregates are formed during polymerization and are not produced by any post-polymerization procedure which would necessitate an extra handling step and the incorporation of foreign materials to the polymer.

The practice of the invention will be more apparent from the following examples which are intended to be exemplary of the invention and not to limit it thereto. All parts are by weight unless otherwise indicated.

Example 1

275 parts of water, 0.5 part $K_2S_2O_8$ and 0.5 parts hexaethylene glycol monolaurate were introduced into a reaction vessel. The charge was boiled 2 minutes under reduced pressure and then the vacuum released with nitrogen. 100 parts of vinyl chloride were added and the mix polymerized at 40° C. with agitation to 85 percent conversion. The polymer was filtered and was in the form of aggregates of small spheres. The aggregates of spheres were introduced into a pebble mill while still wet and milled for 24 hours. The spheres so isolated were filtered, washed with water and dried. They had average particle sizes near 1 micron, and deviated from this mean only slightly.

Example 2

10 parts of the polymeric spheres of Example 1 were added with stirring to 10 parts of dioctyl phthalate. Also another plastisol was made by mixing in a similar manner 10 parts of polymeric spheres prepared by spray drying a polyvinyl chloride latex to 10 parts of dioctyl phthalate. Films were cast from each dispersion. The films cast from the dispersions made with the resin prepared according to this invention had higher tensile strengths by a margin of about 100 pounds per square inch than films made from the spray dried latex plastisol. The other properties of the two films, including their elongation characteristics, were about equal.

Example 3

100 parts of vinyl chloride were polymerized by the procedure of Example 1 using 0.5 part of ethylene diamine tetraacetic acid (zwitter ion form) in place of the hexaethylene glycol monolaurate. The isolated spheres were formulated into a plastisol by the procedure of Example 2.

Example 4

Vinyl chloride was polymerized by the method of Example 3 in which the ethylene diamine tetraacetic acid (zwitter ion form) was replaced by the ammonium salt of ethylene diamine tetraacetic acid, the spheres of polymer could be formed into a plastisol.

Example 5

Spheres of polyvinyl chloride suitable for formulating into plastisols were prepared by polymerizing vinyl chloride by the procedure of Example 3 in which the ethylene diamine tetraacetic acid (zwitter ion form) was replaced by nitrile triacetic acid.

Example 6

Polyvinyl chloride spheres suitable for formulating into plastisols were prepared by polymerizing vinyl chloride by the procedure of Example 1 in which the 0.5 part of hexaethylene glycol monolaurate was replaced by 1.0 part of sucrose.

Example 7

Polyvinyl chloride spheres were prepared by the method of Example 6 in which the sucrose was replaced by glycerine. The spheres could be formulated into a plastisol.

Example 8

Vinyl chloride was polymerized by the method of Example 6 in which the sucrose was replaced by mannitol. The spheres were of a size similar to those of Example 6.

Example 9

Spheres of polyvinyl chloride suitable for formulating into plastisols were prepared by polymerizing vinyl chloride by the procedure of Example 6 in which the sucrose was replaced by a gluconic acid.

Example 10

Vinyl chloride was polymerized by the method of Example 6 in which the sucrose was replaced by ammonium gluconate. The spheres were of a size that could be formulated into a plastisol.

Example 11

Polyvinyl chloride spheres suitable for formulating into plastisols were prepared by polymerizing vinyl chloride by the procedure of Example 6 in which the sucrose was replaced by fructose.

When methyl cellulose was substituted for any of the water dispersible agents of the above examples the resulting polyvinyl chloride product could not be resolved into individual spherical particles but the result of the grinding was irregular shaped particles of a size ranging from about 50 to about 100 microns. These were too large for use in making successful plastisols.

Resins prepared in the manner described in this invention are suitable for use in organosols, plastisols, or other similar dispersions without further modification. These resin particles are substantially free from water soluble contaminants.

What is claimed is:

1. A process for preparing aggregates of individual spheres of polyvinyl chloride comprising (1) preparing an aqueous dispersion consisting of vinyl chloride monomer, and an aqueous phase consisting of (*a*) from 1 to 4 parts by weight of water per part of said monomer, (*b*) a water soluble free radical polymerization catalyst, and (*c*) from 0.05 to 15 percent of the weight of the vinyl chloride of a water-dispersible, low molecular weight, non-micelle-forming, organic agent selected from the group consisting of ethylene diamine tetraacetic acid, ammonium salt of ethylene diamine tetraacetic acid, nitrilo triacetic acid, sucrose, fructose, mannitol, glycerine, gluconic acid, and ammonium gluconate; (2) inducing and maintaining polymerization of said vinyl chloride at a temperature of from about 0° C. to 45° C. while agitating said dispersion until a conversion of about 70 to about 90 percent monomer to polymer has been attained and (3) isolating the so-formed aggregates of individual spheres of polyvinyl chloride.

2. The process of claim 1, wherein said organic agent is a polyhydroxy compound having at least two hydroxyls on adjacent carbon atoms.

3. The process of claim 2, wherein said organic agent is sucrose.

4. The process of claim 2, wherein said agent is fructose.

5. The process of claim 1, wherein said organic agent is gluconic acid.

References Cited by the Examiner

UNITED STATES PATENTS

| | | | |
|---|---|---|---|
| 2,553,916 | 5/51 | Halibig | 260—92.8 |
| 2,580,277 | 12/51 | Boyd et al. | 260—92.8 |
| 2,694,053 | 11/54 | Uraneck et al. | 260—92.8 |
| 2,697,700 | 12/54 | Uraneck et al. | 260—92.8 |
| 2,702,798 | 2/55 | Burleigh et al. | 260—92.8 |
| 2,721,859 | 10/55 | Fuhrman | 260—92.8 |
| 2,772,256 | 11/56 | Manganelli | 260—92.8 |
| 2,772,258 | 11/56 | Manganelli | 260—92.8 |
| 2,812,318 | 11/57 | Kreager | 260—92.8 |
| 2,820,028 | 1/58 | Wenning | 260—92.8 |
| 2,823,200 | 2/58 | Longley | 260—92.8 |
| 2,833,754 | 5/58 | Richards | 260—92.8 |
| 2,836,585 | 5/58 | Hill | 260—92.8 |
| 2,847,410 | 8/58 | Kuhn | 260—92.8 |
| 2,875,186 | 2/59 | Gerhard | 260—92.8 |
| 2,886,551 | 5/59 | McNulty | 260—92.8 |
| 2,886,559 | 5/59 | Wiley | 260—92.8 |
| 2,890,211 | 6/59 | Lintala | 260—92.8 |
| 3,037,007 | 5/62 | Scholtz et al. | 260—92.8 |

LEON J. BERCOVITZ, *Primary Examiner.*

H. N. BURSTEIN, MILTON STERMAN, N. G. TORCHIN, J. R. LIBERMAN, *Examiners.*